United States Patent
Hideshima

(10) Patent No.: US 11,230,059 B2
(45) Date of Patent: Jan. 25, 2022

(54) PLASTICIZING DEVICE AND THREE DIMENSIONAL MODELING APPARATUS

(71) Applicant: Seiko Epson Corporation, Tokyo (JP)

(72) Inventor: Yasutoshi Hideshima, Matsumoto (JP)

(73) Assignee: Seiko Epson Corporation

(*) Notice: Subject to any disclaimer, the term of this patent is extended or adjusted under 35 U.S.C. 154(b) by 238 days.

(21) Appl. No.: 16/596,872

(22) Filed: Oct. 9, 2019

(65) Prior Publication Data

US 2020/0114582 A1    Apr. 16, 2020

(30) Foreign Application Priority Data

Oct. 10, 2018    (JP) .............................. JP2018-191602

(51) Int. Cl.
| | |
|---|---|
| *B29C 64/314* | (2017.01) |
| *B29C 64/209* | (2017.01) |
| *B29C 64/241* | (2017.01) |
| *B29C 64/255* | (2017.01) |
| *B29C 64/245* | (2017.01) |
| *B33Y 40/00* | (2020.01) |
| *B33Y 30/00* | (2015.01) |

(52) U.S. Cl.
CPC .......... *B29C 64/314* (2017.08); *B29C 64/209* (2017.08); *B29C 64/241* (2017.08); *B29C 64/245* (2017.08); *B29C 64/255* (2017.08); *B33Y 30/00* (2014.12); *B33Y 40/00* (2014.12)

(58) Field of Classification Search
None
See application file for complete search history.

(56) References Cited

U.S. PATENT DOCUMENTS

| | | | | |
|---|---|---|---|---|
| 1,533,191 A | * | 4/1925 | Kaiser ..................... | B29C 48/84 100/339 |
| 1,935,050 A | * | 11/1933 | Gordon ................... | B29C 48/56 366/80 |

(Continued)

FOREIGN PATENT DOCUMENTS

| | | |
|---|---|---|
| CN | 201435691 Y | 3/2010 |
| JP | 2009-285879 A | 12/2009 |

(Continued)

*Primary Examiner* — Xiao S Zhao
*Assistant Examiner* — Emmanuel S Luk
(74) *Attorney, Agent, or Firm* — Harness, Dickey & Pierce, P.L.C.

(57) ABSTRACT

A plasticizing device includes a rotor having a rotation shaft and a groove-formed surface that includes a groove formed in the rotation direction and that inclined from the rotation shaft in a radial direction with respect to a radial direction orthogonal to the center axis, a facing unit having a facing surface inclined so as to face the groove-formed surface in the radial direction, a heater heating a material to be supplied between the facing surface and the rotor, and a communication hole through which the material plasticized by heat of the heater flows, a drive motor generating rotational driving force, a connection unit fitting to the rotor in a direction along a rotation shaft of the drive motor, connecting the rotation shaft of the drive motor and the rotor to each other, and transmitting the rotational driving force of the drive motor to the rotor, and an elastic member disposed between the rotor and the connection unit.

7 Claims, 10 Drawing Sheets

(56) References Cited

U.S. PATENT DOCUMENTS

| | | | | | |
|---|---|---|---|---|---|
| 1,951,427 | A | * | 3/1934 | Lodge | B29C 48/85 |
| | | | | | 366/87 |
| 2,783,498 | A | * | 3/1957 | Richardson | B29C 48/832 |
| | | | | | 425/306 |
| 2,787,022 | A | * | 4/1957 | Chisholm | B30B 11/24 |
| | | | | | 425/79 |
| 3,283,041 | A | * | 11/1966 | Sommerfeld | B29C 48/875 |
| | | | | | 264/40.6 |
| 3,305,893 | A | * | 2/1967 | Machen | B29C 48/845 |
| | | | | | 425/379.1 |
| 3,946,803 | A | * | 3/1976 | Heitzer | B29C 48/85 |
| | | | | | 165/87 |
| 4,395,376 | A | * | 7/1983 | Matthews | B29C 45/74 |
| | | | | | 264/73 |
| 4,553,922 | A | * | 11/1985 | Winner | B01F 7/00816 |
| | | | | | 425/381.2 |
| 2014/0157660 | A1 | * | 6/2014 | Carrera Varela | B30B 9/125 |
| | | | | | 44/589 |
| 2016/0200024 | A1 | * | 7/2016 | Kim | G05B 19/188 |
| | | | | | 425/143 |
| 2017/0210069 | A1 | | 7/2017 | Stubenruss | |
| 2020/0114543 | A1 | * | 4/2020 | Conrad | B29B 17/0412 |

FOREIGN PATENT DOCUMENTS

| | | | | |
|---|---|---|---|---|
| JP | 2010000752 A | * | 1/2010 | B29C 45/46 |
| JP | 2011-020378 A | | 2/2011 | |
| JP | 2017-523934 A | | 8/2017 | |

\* cited by examiner

| | VARIATION COEFFICIENT OF 10 rpm | VARIATION COEFFICIENT OF 20 rpm | VARIATION COEFFICIENT OF 30 rpm |
|---|---|---|---|
| WITH ELASTIC MEMBER | 0.010 | 0.011 | 0.009 |
| WITHOUT ELASTIC MEMBER | 0.112 | 0.084 | 0.072 |

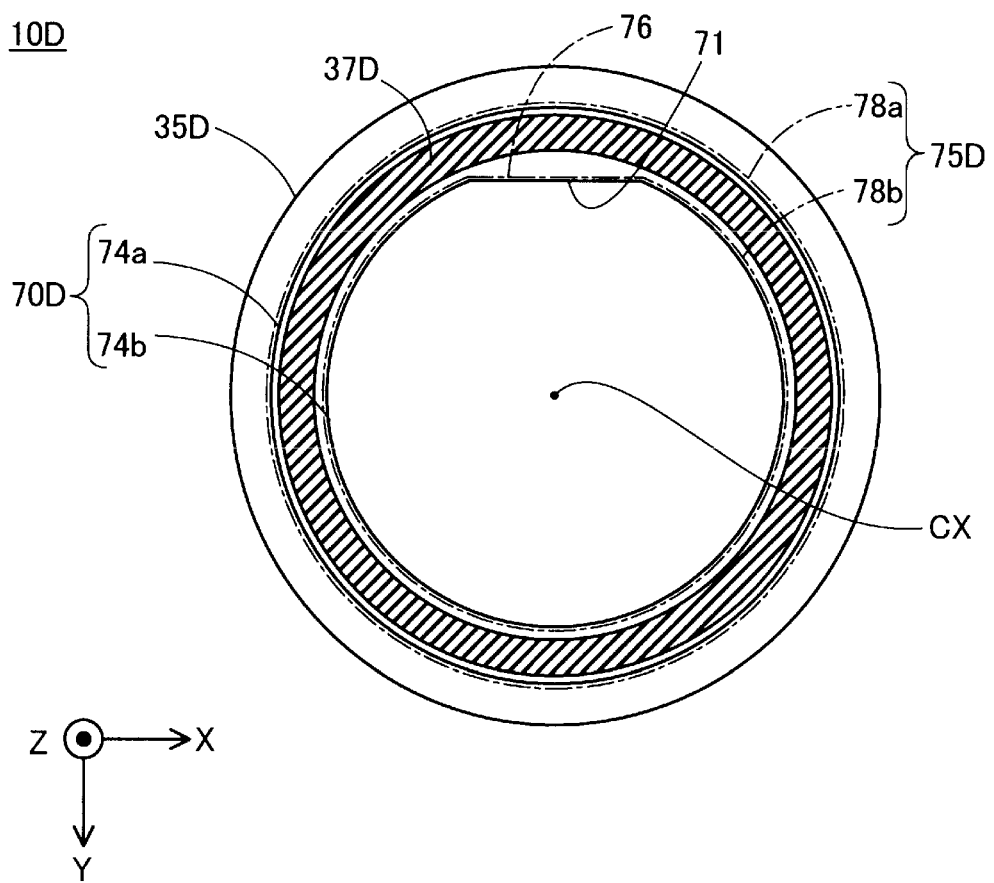

PLASTICIZING DEVICE AND THREE DIMENSIONAL MODELING APPARATUS

The present application is based on, and claims priority from, JP Application Serial Number 2018-191602, filed Oct. 10, 2018, the disclosure of which is hereby incorporated by reference herein in its entirety.

BACKGROUND

1. Technical Field

The present disclosure relates to a plasticizing device.

2. Related Art

A plasticizing device heating to melt to plasticize a material to be used in three-dimensional molding and injection molding is known. For example, a plasticizing device placed in a 3D printer which is a three-dimensional modeling apparatus is disclosed in JP-T-2017-523934. The plasticizing device disclosed in JP-T-2017-523934 rotates a disc, which is a rotor, and guides the material to an outlet while plasticizing in a spiral flow path provided between the disk and a heating plate.

In the plasticizing device disclosed in JP-T-2017-523934, in order to adjust pressure of the material inside the spiral flow path the disk is displaceably held in a direction along a rotation axis by a spring attached to an upper surface center thereof. In such a configuration, when the material is unevenly distributed inside the flow path and the spring is biasedly stretched and compressed, there is a possibility the rotation axis of the disk is eccentric and that the rotation of the disk ends up being unstable. This is not limited to the plasticizing device disclosed in JP-T-2017-523934, and it is desirable that rotation of the rotor is stabilized in order to stably plasticize the material in the plasticizing device rotating the rotor and plasticizing the material inside a groove provided in the rotor.

SUMMARY

An aspect of the present disclosure is provided as a plasticizing device. The plasticizing device according to the aspect includes a rotor having a rotation shaft and a groove-formed surface that includes a groove formed in a rotation direction and that is inclined from the rotation shaft to an outer circumference end of the rotor, a facing unit having a facing surface circumferentially inclined so as to face the groove-formed surface in the radial direction, a heater heating a material to be supplied between the facing surface and the groove, and a communication hole through which the material plasticized by heat of the heater flows, a drive motor generating a rotational driving force, a connection unit fitting to the rotor in a direction along the rotation shaft of the drive motor, connecting the rotation shaft of the motor and the rotor to each other, and transmitting the rotational driving force of the motor to the rotor, and an elastic member disposed between the rotor and the connection unit.

BRIEF DESCRIPTION OF THE DRAWINGS

FIG. 8B is a schematic plan view showing the configuration of the connection unit according to the fourth embodiment.

DESCRIPTION OF EXEMPLARY EMBODIMENTS

1. First Embodiment

Figure 1:
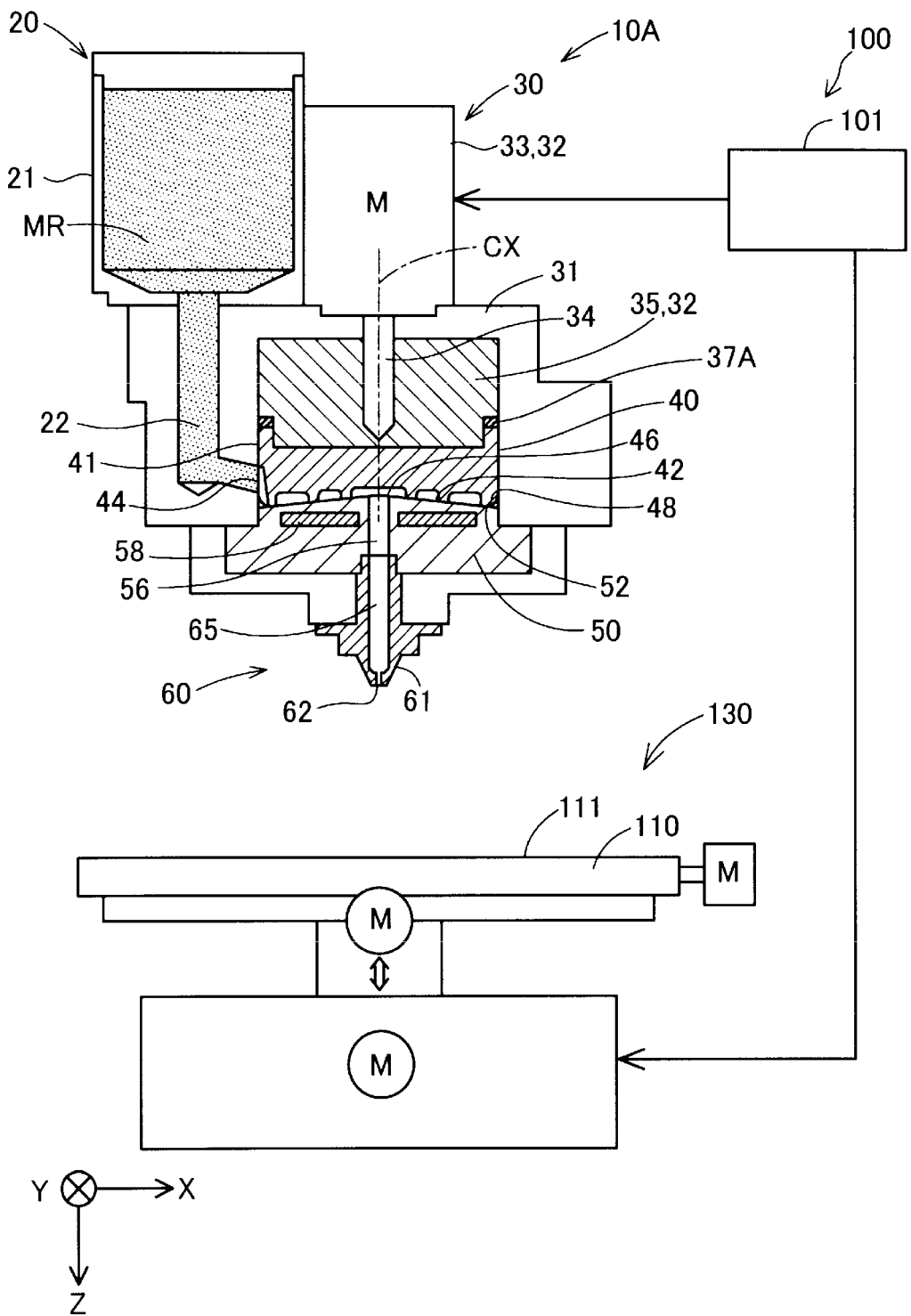
FIG. 1 is a schematic view showing a configuration of a three-dimensional modeling apparatus including a plasticizing device according to a first embodiment.

FIG. 1 is a schematic view showing a configuration of a three-dimensional modeling apparatus 100 including a plasticizing device 10A in a first embodiment. Arrows indicating X, Y, and Z directions orthogonal to one another are shown in FIG. 1. The X-direction indicated by the arrow X and the Y direction indicated by the arrow Y are parallel to each other on a horizontal plane, and the Z direction indicated by the arrow Z coincides with the vertical direction. The vertical direction may be reworded into the gravity direction. The arrows indicating X, Y, and Z directions are also shown in other reference diagrams such that the directions of the diagrams correspond to the directions of FIG. 1.

The three-dimensional modeling apparatus 100 accumulates a molding material plasticized by the plasticizing device 10A to mold a three-dimensional object. "Plasticizing" means melting a material having thermoplasticity by heating. Hereinafter, "three-dimensional modeling apparatus" will be simply referred to as "modeling apparatus" and a molded three-dimensional object will be simply referred to as "molded object". "Molding material" will be described below.

The plasticizing device 10A includes a supply unit 20 supplying the material MR which is a raw material before being converted into a molding material and a generation unit 30 converting the material MR into the molding material. The supply unit 20 includes a material supply source 21 storing the material MR and a coupling tube path 22 leading the material MR of the material supply source 21 to the generation unit 30.

The material supply source 21 is configured with a hopper containing the material MR. The material supply source 21 has a discharge port down below. The discharge port is coupled to the generation unit 30 through the coupling tube path 22. The material MR is input into the material supply source 21 in a form of pellets, powder, or the like in the first embodiment.

The generation unit 30 melts the material MR supplied from the material supply source 21 to generate a pasty molding material plasticized to exhibit fluidity and leads the molding material to an ejection unit 60. The generation unit 30 has a case 31, a drive mechanism 32, a rotor 40, and a facing unit 50.

The case 31 has a recessed space opening down below, and the connection unit 35 of the drive mechanism 32, to be described below, and the rotor 40 are accommodated inside the recessed space. The open port of the case 31 down below is closed by the facing unit 50.

The coupling tube path 22 described above is provided inside the case 31.

Inside the case 31, a refrigerant flow path (not shown) through which a refrigerant for suppressing a temperature rise of the material MR inside the coupling tube path flow 22 is provided so as to surround the outer circumference of the rotor 40.

The drive mechanism 32 rotates the rotor 40 inside the case 31. The drive mechanism 32 includes a drive motor 33 generating a rotational driving force and the connection unit 35 connecting the drive motor 33 and the rotor 40 to each other. The drive motor 33 is disposed above the case 31. A rotation shaft 34 of the drive motor 33 passes through a communication hole provided in a top surface portion of the case 31 to be connected to the connection unit 35 on a center axis of the connection unit 35.

The connection unit 35 is disposed above the rotor 40 so as to cover an upper surface of the rotor 40. A fitting protrusion portion and a fitting recess portion, to be described below, are fitted in a direction along the rotation shaft of the drive motor 33 so that the connection unit 35 and the rotor 40 are connected to each other.

The connection unit 35 connects the drive motor 33 and the rotor 40 such that the rotation shaft 34 of the drive motor 33 is positioned on the center axis CX of the rotor 40. In the first embodiment, the connection unit 35 has a gear (not shown) inside and has a function as a reduction gear of the drive motor 33. The connection unit 35 is configured to divide into two (not shown) in the Z direction, the portion thereof on the drive motor 33 side is fixed to the case 31, and the portion thereof on the rotor 40 side rotates together with the rotor 40 at a lower speed than the drive motor 33. In another embodiment, the connection unit 35 may not be configured to divide, and the entire connection unit 35 may be configured to rotate together with the rotor 40 at a lower speed than the drive motor 33 by an inside gear (not shown). Further, in still another embodiment, the connection unit 35 may not be configured as a reduction gear and may be configured as a member having no movable section.

The connection unit 35 has an elastic member 37A disposed between the connection unit 35 and the rotor 40 so as to surround the center axis CX of the rotor 40. The elastic member 37A is disposed at a position closer to an outer circumference end of the rotor 40 than to the center axis CX of the rotor 40. In the first embodiment, the elastic member 37A is disposed along the outer circumference of the rotor 40. Further, in the first embodiment, the elastic member 37A is configured with an annular elastic body. The elastic member 37A is configured with a silicon resin, a fluorine resin such as Teflon (registered trademark), or a resin material such as rubber, for example. In another embodiment, the elastic member 37A may be configured with a metal member formed to be elastically deformed such as a coil spring, an annular leaf spring, a wave washer, an annular metal gasket, or the like.

The connection unit 35 transmits a rotational driving force of the drive motor 33 to the rotor 40 while allowing a posture change of the rotor 40 with respect to the rotation shaft 34 of the drive motor 33 by elastic deformation of the elastic member 37A. In the plasticizing device 10A according to the first embodiment, when the rotor 40 rotates, rotation of the rotor 40 is stabilized by the elastic deformation of the elastic member 37A in a state where the rotor 40 is guided to the facing surface 52 of the facing unit 50 described later. Details of a connection structure of the connection unit 35 and the rotor 40 through the elastic member 37A and the stabilization of the rotation of the rotor 40 by the elastic member 37A will be described below in detail.

The rotor 40 is disposed such that the center axis CX thereof is parallel to the Z direction and rotates in the circumference direction with the center axis CX as a rotation axis inside the case 31 by the rotational driving force generated by the drive mechanism 32. The rotor 40 has a groove 42 formed in the rotation direction and rotates to plasticize and feed the material MR while kneading the material MR inside the groove 42. "Kneading" means kneading the material while mixing.

In the first embodiment, the rotor 40 is configured as a so-called flat screw and has an approximately cylindrical shape of which the height in the axial direction, which is a direction along the center axis thereof, is shorter than the diameter. The rotor 40 is oriented in the Z direction and has a groove-formed surface 48 on which the groove 42 is formed. The groove-formed surface 48 is slightly inclined from the center axis CX in a radial direction with respect to the radial direction orthogonal to the center axis CX of the rotor 40. That is, the groove-formed surface 48 is inclined so as to be hollowed toward the center axis CX. The inclination angle of the groove-formed surface 48 with respect to the radial direction orthogonal to the center axis CX of the rotor 40 may be about 1 to 10°, for example.

Figure 2A:
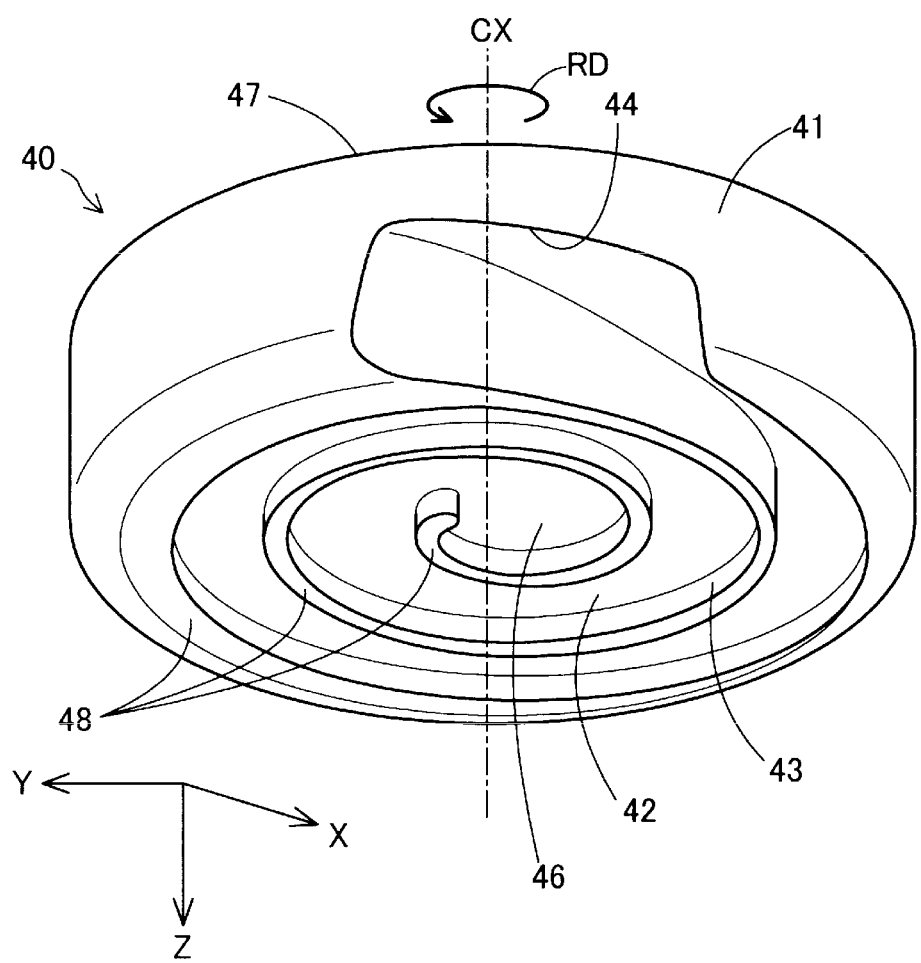
FIG. 2A is a schematic perspective view showing the configuration of a rotor.

As shown in FIG. 2A to be referred to below, the groove 42 is configured as a so-called scroll groove and is formed in a swirling shape from the outer circumference side surface 41 toward the center portion 46 through which the center axis CX of the rotor 40 passes. The groove 42 is formed up to the outer circumference side surface 41 of the rotor 40. The material MR passes through an open end portion 44 of the groove 42 opening on the outer circumference side surface 41 of the rotor 40 and is guided from the coupling tube path 22 to a space inside the groove 42. Hereinafter, the open end portion 44 of the groove 42 will be also referred to as a "material guide portion 44". The specific configurations of the rotor 40 and the groove 42 will be described below.

The facing unit 50 has the facing surface 52 which is an upper surface facing the groove-formed surface 48 of the rotor 40. The facing unit 50 may be referred to as a barrel. The facing surface 52 is inclined so as to correspond to the inclination of the groove-formed surface 48 of the rotor 40. The facing surface 52 is slightly inclined from the center axis CX of the rotor 40 to the radial direction so as to face the groove-formed surface 48 in the radial direction of the rotor 40. In the first embodiment, the facing surface 52 slightly rises from the outer circumference end toward the center, and the center of the facing surface 52 is positioned above the outer circumference end of the facing surface 52. The height difference between the center of the facing surface 52 and the outer circumference end of the facing surface 52 in the Z direction may be approximately two to three millimeters, for example. In the first embodiment, the inclination angles of the groove-formed surface 48 and the facing surface 52 are not the same, and distance between the groove-formed surface 48 and the facing surface 52 decreases from the outer circumference end of the rotor 40 toward the center axis CX.

A disposition position of the connection unit 35 with respect to the case 31 is fixed between the groove-formed surface 48 of the rotor 40 and the facing surface 52 of the facing unit 50 such that a gap equal to or less than 10 μm is formed. It is desirable that DLC coating is applied to at least either of the groove-formed surface 48 and the facing surface 52.

A communication hole 56 through which the molding material flows is provided in the center position of the facing surface 52 through which the center axis CX of the rotor 40 passes. Further, a heater 58 heating the material MR supplied inside the groove 42 of the rotating rotor 40 is embedded below the facing surface 52 in the facing unit 50. Plasticization of the material MR in the generation unit 30 is realized by the heating by the heater 58 and rotation of the rotor 40.

The material MR supplied inside the groove 42 is kneaded and melted inside the groove 42, flows along the groove 42 by the rotation of the rotor 40, and is guided to a center portion 46 of the rotor 40 as a molding material. The plasticized molding material flowing into the center portion 46 flows out of the generation unit 30 through the communication hole 56. In the plasticizing device 10A according to the first embodiment, employing a small-sized rotor 40 in the Z direction reduces the range occupied, in the Z direction, by the path for melting, and guiding to a nozzle 61, the material MR.

The plasticizing device 10A may not melt and plasticize all kinds of substances included in the material MR. The plasticizing device 10A may melt to plasticize at least some kinds of substances out of the substances constituting the molding material and convert the material MR into a fluid state as a whole. The specific example of the substances constituting the molding material will be described after the description of respective embodiments.

The modeling apparatus 100 further includes a control unit 101 controlling the modeling apparatus 100, an ejection unit 60 ejecting the molding material generated in the plasticizing device 10A, a molding table 110 serving as abase of a molded object, and a move mechanism 130 controlling an ejection position of the molding material.

The control unit 101 controls the plasticizing device 10A, the ejection unit 60, and the move mechanism 130 and executes molding processing molding an object. In the first embodiment, the control unit 101 is configured with a computer including at least either of a processor and a main storage device. The control unit 101 performs various functions by a processor executing a program or a command read on the main storage device. In another embodiment, at least some functions of the control unit 101 may be realized by a hardware circuit.

The ejection unit 60 ejects the molding material supplied from the plasticizing device 10A to a target position on the table 110 under the control of the control unit 101. The ejection unit 60 includes the nozzle 61 having an ejection port 62 through which the molding material is ejected and a flow path 65 through which the molding material is guided to the nozzle 61.

The ejection port 62 of the nozzle 61 is open toward a molding surface 111 of the table 110 in the Z direction. The nozzle 61 is coupled to the communication hole 56 of the facing unit 50 of the plasticizing device 10A through the flow path 65. A valve mechanism for controlling a flow rate of the molding material may be provided in the flow path 65. The molding material generated in the generation unit 30 is ejected from the ejection port 62 provided at a tip end of the nozzle 61 toward table 110.

The table 110 is disposed below the ejection unit 60. In the first embodiment, the molding surface 111 of the table 110 is disposed horizontally, that is, parallel to X and Y directions. The modeling apparatus 100 repeats processing of accumulating the molding material at a target position on the molding surface 111 of the table 110, preset according to the molding data, to mold an object.

The move mechanism 130 changes a relative positional relationship between the table 110 and the nozzle 61. In the first embodiment, the position of the nozzle 61 is fixed and the move mechanism 130 moves the table 110. The move mechanism 130 is configured with a three-axis positioner moving the table 100 in the three directions of the X, Y, and Z directions by the driving force of three motors M. The move mechanism 130 changes the relative positional relationship between the nozzle 61 and the table 110 under the control of the control unit 101.

In another embodiment, instead of a configuration in which the table 110 is moved by the move mechanism 130, a configuration in which the move mechanism 130 moves the nozzle 61 with respect to the table 110 in a state where the position of the table 110 is fixed may be adopted. Even in such a configuration, it is possible to change the relative position of the nozzle 61 with respect to the table 110. Further, in still another embodiment, a configuration in which the move mechanism 130 moves the table 110 and the nozzle 61 respectively to change the relative position of the two may be adopted.

FIG. 2A is a schematic perspective view showing a configuration of the groove-formed surface 48 side of the rotor 40 in the first embodiment. In FIG. 2A, the center axis CX of the rotor 40 is denoted by a one-dot chain line. Further, in FIG. 2A, a rotation direction RD in which the rotor 40 rotates in the generation unit 30 is shown.

The rotor 40 according to the first embodiment has a streak of protrusion streak portion 43, a streak of groove 42, and a center portion 46 on the groove-formed surface 48 side. The protrusion streak portion 43 is a wall unit constituting a side wall unit on both sides of the groove 42 and swirlingly extends from the outer circumference end of the rotor 40 toward the center axis CX. The groove-formed surface 48 of the rotor 40 includes an end surface of the protrusion streak portion 43 of the rotor 40 in the Z direction and is defined by the end surface. The center portion 46 is configured as a recess portion to which one end of the groove 42 is coupled and which is surrounded by the protrusion streak portion 43. The center portion 46 faces the communication hole 56 of the facing unit 50 shown in FIG. 1 and FIG. 3 to be referred to below. The center portion 46 intersects with the center axis CX.

The groove 42 of the rotor 40 spirally extends in a manner of drawing an arc from the material guide portion 44 opened on the outer circumference side surface 41 of the rotor 40 toward the center axis CX to be coupled to the center portion 46. The groove 42 may be configured to spirally extend. It is desirable that the groove 42 is configured such that the flow path sectional area of the groove 42 decreases from the material guide portion 44 toward the center portion 46. In this way, it is possible to further raise the pressure of the center portion 46 when the material MR is plasticized. In the first embodiment, the width and depth of the groove 42 decrease from the material guide portion 44 toward the center portion 46.

Figure 2B:
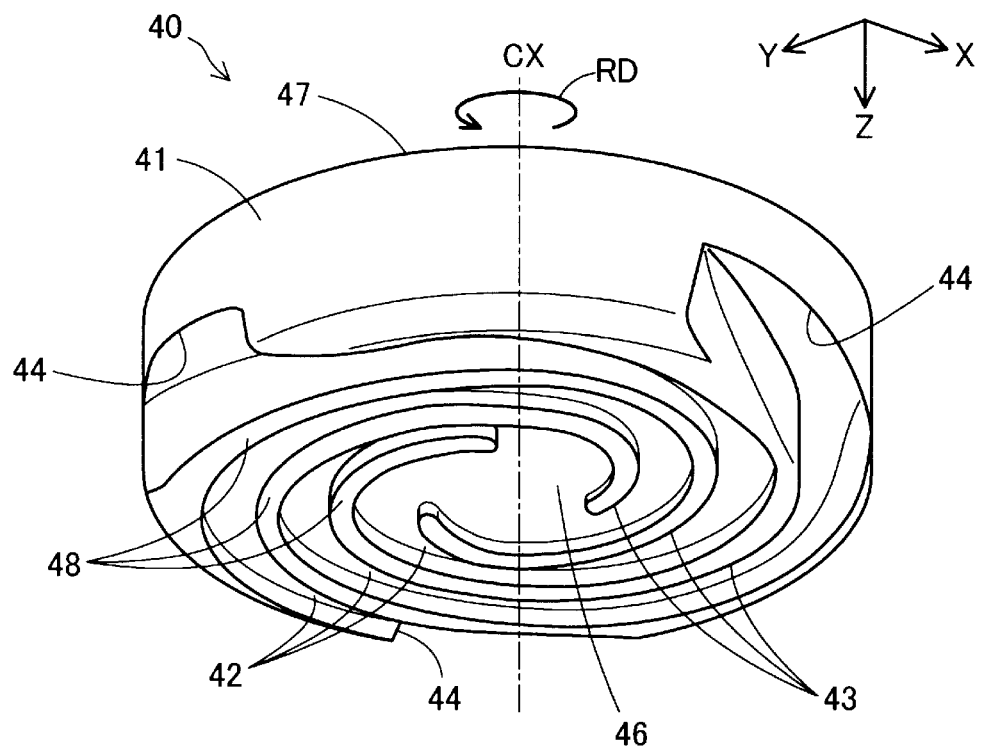
FIG. 2B is a schematic perspective view showing another configuration example of the rotor.

FIG. 2B is a schematic view showing another configuration example of the rotor 40. In another embodiment the number of the grooves 42 and the protrusion streak portion 43 of the rotor 40 is not limited to one. In the another embodiment, as shown in the example in FIG. 2B, the rotor 40 may have three streak of grooves 42 and three streaks of protrusion streaks portion 43. Further, the rotor 40 may have two streaks of grooves 42 or may have four or more streaks of grooves 42. Further, in accordance with the number of grooves 42, any number of the protrusion streak portion 43 may be provided in the rotor 40.

In the first embodiment, as shown in FIG. 2A, the material guide portion 44 is provided at one place only on the outer circumference side surface 41 in the rotor 40. Contrary to this, in the another embodiment, as shown in FIG. 2B, the material guide portion 44 may be provided at three place. The number of the material guide portion 44 provided in the rotor 40 is not limited to one or three. The material guide portion 44 may be provided at two places or may be provided at four or more places in the rotor 40.

Figure 3:
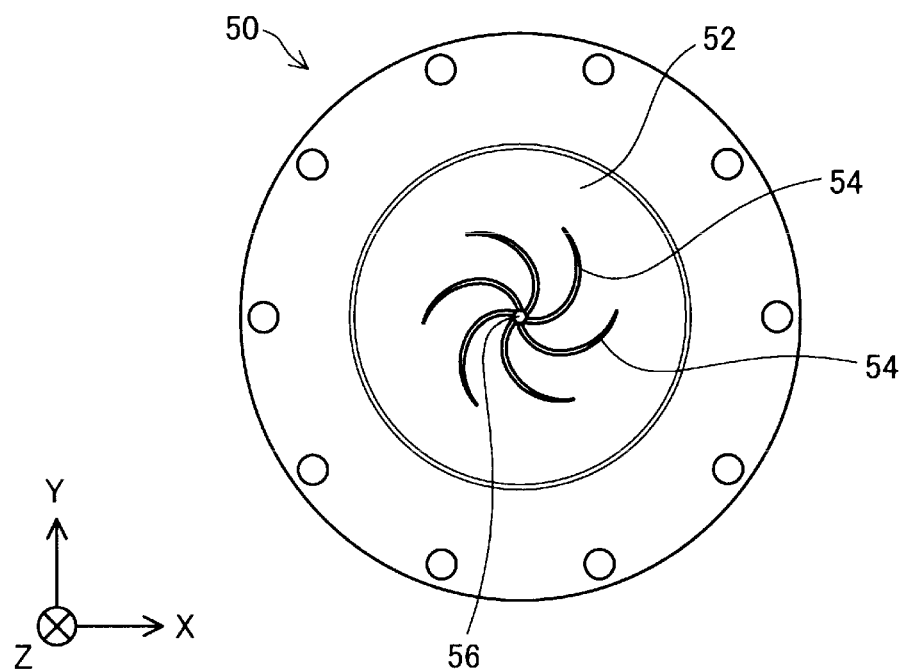
FIG. 3 is a schematic plan view showing the configuration of a facing section.

FIG. 3 is a schematic plan view showing the facing surface 52 of the facing unit 50 as viewed in the Z direction. The facing surface 52 is positioned at the center of the facing unit 50 and may have an annular shape of the approximately same diameter as the groove-formed surface 48 of the rotor 40. As described with reference to FIG. 1, the heater 58 is embedded in the facing surface 52 of the facing unit 50. The communication hole 56 described above is provided at the center of the facing surface 52 and a plurality of guide grooves 54 swirlingly extending from the communication hole 56 toward the outer circumference are formed around the communication hole 56. The plurality of guide grooves 54 face the center portion 46 of the rotor 40 and introduce the molding material flowing into the center portion 46 to the communication hole 56.

Refer to FIG. 1. In the plasticizing device 10A according to the first embodiment, the material MR is supplied from the radially outer side of the rotor 40 to the open end portion 44 of the outer circumference side surface 41 of the rotor 40 through the coupling tube path 22. Further, as described above, in the plasticizing device 10A according to the first embodiment, a refrigerant flow path (not shown) is provided so as to surround the outer circumference of the rotor 40. Therefore, since the material MR is prevented from receiving heat from the rotor 40 before entering the groove 42, the plasticized material MR is prevented from blocking the open end portion 44.

Refer to FIGS. 1 and 2A. When the rotor 40 rotates, the material MR moves along the groove 42 toward the center portion 46 while being plasticized and melts as the temperature rises toward the center portion 46. The molding material collected in the center portion 46 is guided to the flow path 65 of nozzle 61 through the communication hole 56 and ejected from the ejection port 62 by the internal pressure generated center portion 46.

According to the generation unit 30 using the rotor 40, since the pressure inside the groove 42 rises higher toward the center portion 46 when the material MR is plasticized, the degree of kneading of the molding material finally generated rises. "The degree of kneading rises" means that the material is kneaded so as to be in a more homogeneous state. Further, since the air present in the voids of the material MR is pushed out to the material guide portion 44 side by the pressure generated inside the groove 42, deaeration of the molding material is promoted.

In the modeling apparatus 100, the configuration in which the molding material having fluidity is generated and pressure-fed to the nozzle 61 is easily realized if the rotor 40 is utilized in the plasticizing device 10A. According to this configuration, the ejection amount of the molding material from the nozzle 61 can be controlled by the control of the rotation speed of the rotor 40 and the control of the ejection amount of the molding material from the nozzle 61 is facilitated.

Figure 4A:
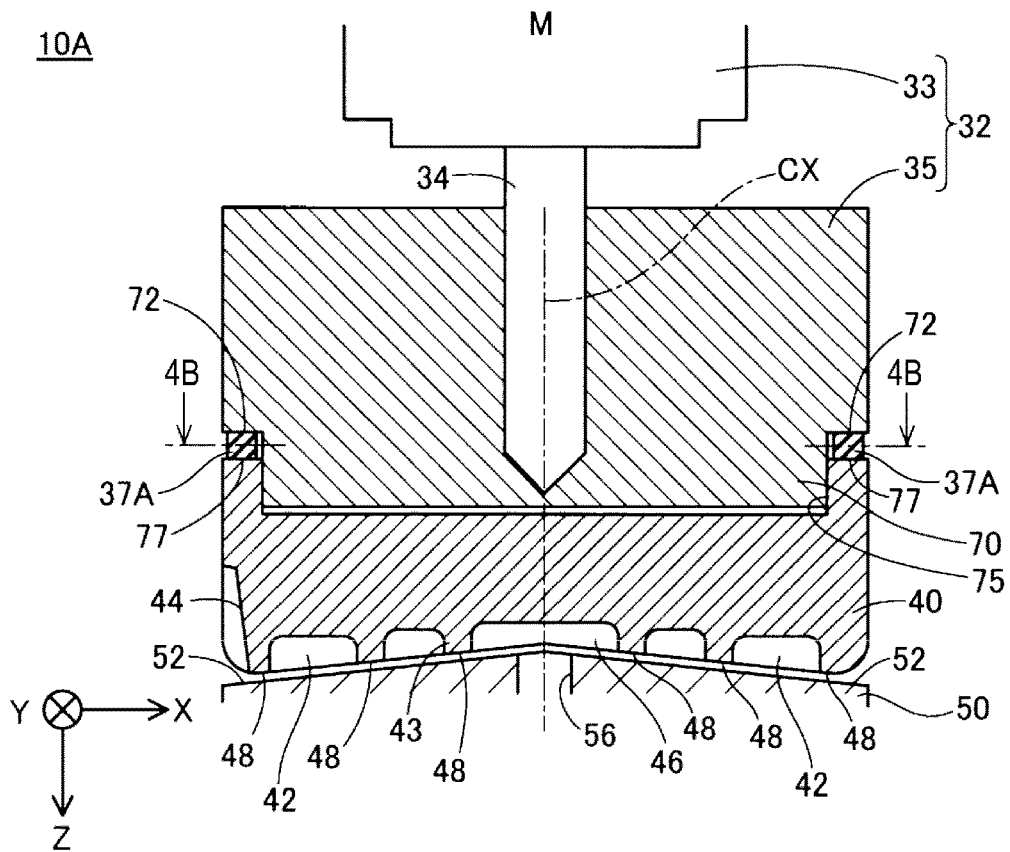
FIG. 4A is a schematic sectional view of a drive mechanism, a rotor, and the facing section.
Figure 4B:
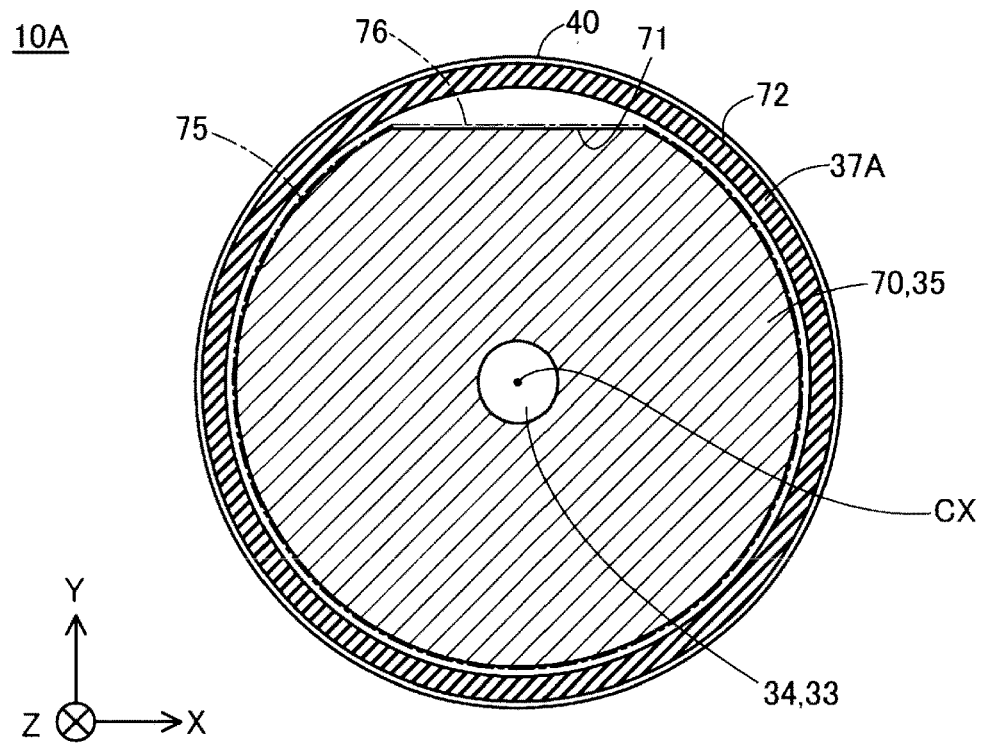
FIG. 4B is a schematic sectional view of a connection unit and an elastic member.

With reference to FIGS. 4A and 4B, the connection structure of the connection unit 35 and the rotor 40 through the elastic member 37A and the function of the connection unit 35 having the elastic member 37A will be described. FIG. 4A is a schematic sectional view of the drive mechanism 32, the rotor 40, and the facing unit 50 in a cutting surface passing through the center axis CX of the rotor 40. FIG. 4B is a schematic sectional view of the connection unit 35 and the elastic member 37A in the 4B-4B cutting shown in FIG. 4A.

The connection unit 35 has an approximately cylindrical shape of which the dimension in the Z direction is smaller than the diameter. As shown in FIG. 4A, the dimension of the connection unit 35 in the Z direction is larger than the dimension of the rotor 40 in the Z direction. The connection unit 35 has a fitting protrusion portion 70 projecting toward the rotor 40 at the center of the bottom surface facing the Z direction. The fitting protrusion portion 70 has a shape of a cylinder of which a side surface is partially cut off and, as shown in FIG. 4B, has an engagement surface 71 which is a plane parallel to the Z direction.

As shown in FIG. 4A, a fitting recess portion 75 accommodating the fitting protrusion portion 70 is provided on the upper surface side of the rotor 40. The fitting protrusion portion 70 is inserted into the fitting recess portion 75 in the direction along the rotation shaft 34 of the drive motor 33, that is, in the direction along the center axis CX of the rotor 40. The opening of the fitting recession portion 75 has a shape fitting into the outer circumference of the fitting protrusion portion 70. In FIG. 4B, the opening of the fitting recess portion 75 when the fitting protrusion portion 70 is fitted is schematically denoted by a one-dot chain line.

An inner wall surface of the fitting recess portion 75 includes an engagement target surface 76 which is parallel to the engagement surface 71 of the fitting protrusion portion 70 and which is a plane facing the engagement surface 71. When the fitting protrusion portion 70 of the connection unit 35 rotates by the drive motor 33, the rotor 40 rotates together with the fitting protrusion portion 70 since the engagement surface 71 of the fitting protrusion portion 70 and the engagement target surface 76 of the fitting recession portion 75 are engaged with each other. In another embodiment, a plurality engagement surfaces 71 and engagement target surfaces 76 may be provided.

As shown in FIGS. 4A and 4B, an annular outer circumference flat portion 72 surrounding the fitting protrusion portion 70 is formed in a direction along the center axis CX of the rotor 40 in the outer circumference edge portion of the connection unit 35. As shown in FIG. 4A, an annual outer circumference flat portion 77 surrounding the fitting recess portion 75 is formed in the outer circumference edge portion on the upper surface side of the rotor 40. The outer circumference flat portion 72 of the connection unit 35 and the outer circumference flat portion 77 of the rotor 40 face each other in the Z direction. In the first embodiment, the elastic member 37A of the connection unit 35 is disposed between the outer circumference flat portion 72 and the outer circumference flat portion 77 of the rotor 40. The elastic member 37A is engaged with the outer circumference flat portion 72 of the connection unit 35 and the outer circumference flat portion 77 of the rotor 40.

Here, a microscopic gap of several μm to tens of μm is formed between the side wall surface of the fitting protrusion portion 70 and the side wall surface of the fitting recess portion 75 facing each other. Therefore, movement in the direction along the rotation shaft 34 of the drive motor 33 facing the connection unit 35 and a slight inclination of less than 1° with respect to the rotation shaft 34 of the drive motor 33 are allowed in the rotor 40. The elastic deformation of the elastic member 37A changes the position and the angle of the rotor 40 with respect to the connection unit 35 and the rotation shaft 34 of the drive motor 33 connected thereto.

Refer to FIG. 4A. As described above, the groove-formed surface 48 of the rotor 40 is inclined from the center axis CX in a radial direction with respect to the radial direction orthogonal to the center axis CX. Further, the facing surface 52 of the facing section 50 is inclined from the center axis CX to the radial direction so as to face the groove-formed surface 48 and the radial direction orthogonal the center axis CX. In this configuration, if the center axis CX of the rotor 40 is inclined when the rotor 40 is rotated at a high speed, the two inclined surfaces 48 and 52 contact with each other and a reaction force is generated to bring the angle of the center axis CX of the rotor 40 close to the center axis of the facing surface 52. By the reaction force acting to correct the inclination of the center axis CX of the rotor 40, the elastic member 37A is elastically deformed and the inclination of the rotor 40 is corrected. In this way, the posture of rotor 40 during a high-speed rotation is appropriately adjusted by the guide of the facing surface 52 so that the groove-formed surface 48 and the facing surface 52 do not get too close to, or too far from, each other. Therefore, destabilization of the rotation of the rotor 40 caused by the eccentricity of the rotor 40 is suppressed and the plasticization of the material MR inside the groove 42 is smoothly performed. Further, since the pressure of the molding material at the center portion 46 of the rotor 40 is stabilized, it is possible to eject the molding material from the communication hole 56 well with stability.

When the rotor 40 is rotated to plasticize the material MR in the groove 42, temperature varies in each part of the rotor 40 in some cases. Therefore, the magnitude of thermal expansion in each part of the rotor 40 differs, the distance between the groove-formed surface 48 of the rotor 40 on the facing surface 52 of the facing unit 50 varies, and there is a possibility that the groove-formed surface 48 and the facing surface 52 come into contact with each other in some parts. In the plasticizing device 10A, even if the groove-formed surface 48 and the facing surface 52 come into contact with each other in some parts, the generation of the frictional resistance between the groove-formed surface 48 and the facing surface 52, big enough to stop the rotation of the rotor 40, by the elastic compression of the elastic member 37A is suppressed. Therefore, stopping of the rotation of the rotor 40 by the contact between the groove-formed surface 48 and the facing surface 52 and delaying of the plasticization of the material MR are suppressed.

In the plasticizing device 10A, if the groove-formed surface 48 and the facing surface 52 come into contact with each other while the rotor 40 rotates at a high speed, the elastic member 37A is elastically deformed by the impact and the posture of the rotor 40 change such that the groove-formed surface 48 and the facing surface 52 are separated away from each other. Therefore, the wear of the rotor 40 and the facing unit 50 caused by the continued contact between the groove-formed surface 48 and the facing surface 52 is suppressed. Further, since the impact generated by the contact between the groove-formed surface 48 and the facing surface 52 is absorbed by the elastic deformation of the elastic member 37A, the deterioration of the durability of the rotor 40 and the facing unit 50 is suppressed.

As described above, in the plasticizing device 10A, the elastic member 37A is disposed at a position closer to the outer circumference end of the rotor 40 than to the center axis CX thereof. Therefore, the posture with respect to the connection unit 35 is more stable as compared with a case in which the elastic member 37A is disposed only at the center position close to the center axis CX. Therefore, the excessive variation of the angle of the rotation shaft of the rotor 40 with respect to the rotation shaft 34 of the drive motor 33 is suppressed by the elastic deformation of the elastic member 37A. In particular, in the first embodiment, since the elastic member 37A is disposed along the outer circumference of the rotor 40, the posture of the rotor 40 is further stabilized.

In the plasticizing device 10A according to the first embodiment, the dimension of the rotor 40 in the Z direction is smaller than the dimension of the connection unit 35 in the Z direction at least. Therefore, even when the dimension of the rotor 40 in the Z direction is larger than the dimension of the connection unit 35 in the Z direction, the magnitude of positional deviation of the groove-formed surface 48 with respect to the center axis of the connection unit 35 when the center axis CX of the rotor 40 during the rotation is inclined is reduced. Therefore, since the positional variation of the groove-formed surface 48 with respect to the posture change of the rotor 40 is suppressed, it is possible to plasticize the material MR more stably.

In the plasticizing device 10A, the distance between the groove-formed surface 48 of the rotor 40 and the facing surface 52 of the facing unit 50 decreases from the outer circumference end of the rotor 40 toward the center axis CX. In this way, in an area close to the outer circumference end of the rotor 40 where the plasticization of the material MR is insufficient and the hardness of the material MR is relatively high, the longer the distance between the groove-formed surface 48 and the facing surface 52 is, the more easily the material MR moves, and the wear of the rotor 40 and the facing unit 50 is suppressed. Further, in an area close to the center axis CX where the plasticization progresses and the fluidity of the material MR becomes high, the shorter the distance between the groove-formed surface 48 and the facing surface 52 is, the further the entrance of melted material MR between the groove-formed surface 48 and the facing unit 50 is suppressed.

Figures 5, 6A:
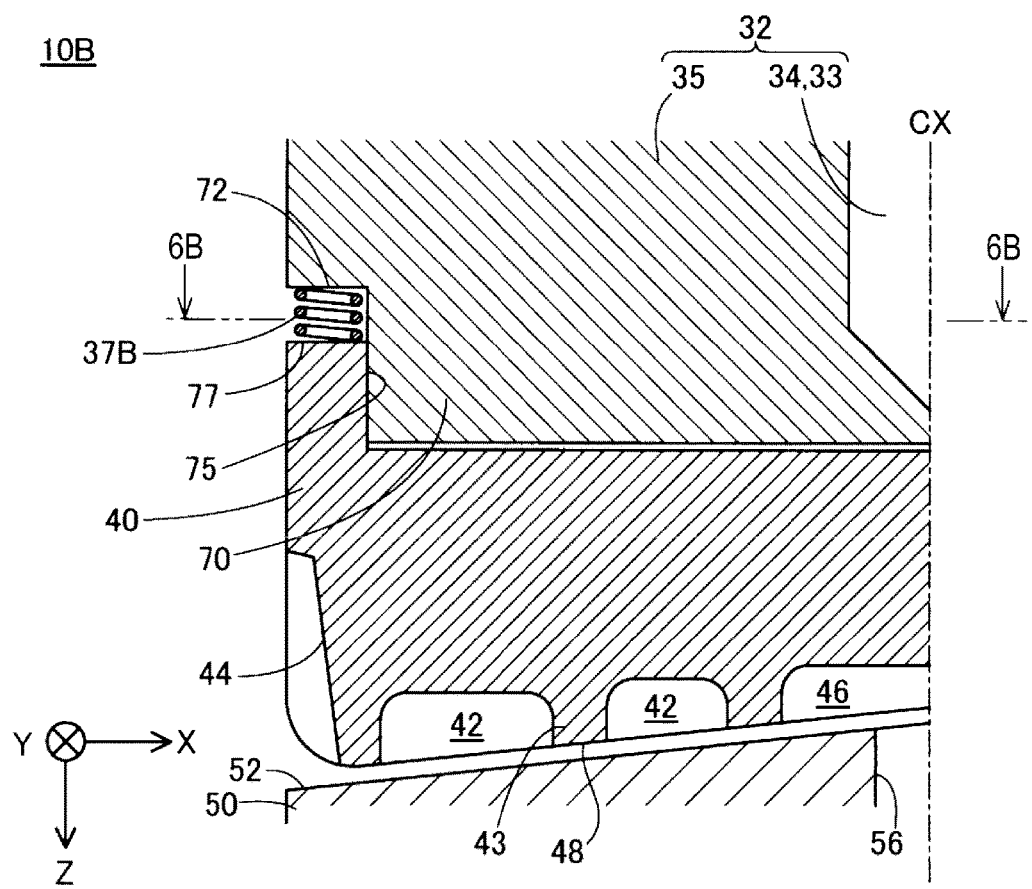
FIG. 5 is a descriptive view showing a check result of a change of an ejection state of a molding material depending on the presence and absence of the elastic member.
FIG. 6A is a schematic sectional view showing the configuration of the connection unit according to a second embodiment.

FIG. 5 is a descriptive view showing an experiment result of an experiment in which changes of the ejection states of the molding material depending on the presence or the absence of the elastic member 37A are checked. In this experiment, a variation coefficient of the ejection amount of the molding material from the ejection unit 60 is measured when the connection unit 35 and the rotor 40 are connected through the elastic member 37A and when the connection unit 35 and the rotor 40 are fixedly integrated without the elastic member 37A. The ejection amount when the molding material is ejected for 30 seconds is measured 20 times for respective rotation speeds of the rotor 40 set at 10 rpm, 20 rpm, and 30 rpm, and the measured values are used in calculating the variation coefficient. A pellet-shaped material MR in which the power of stainless steel with an average particle diameter of 4 μm is mixed with a binder containing a material having the thermoplasticity is used.

As shown in FIG. 5, in this experiment, the variation coefficient is substantially lower when the elastic member 37A is used than when the elastic member 37A is not used at any rotation speed. In this way, the variation of the ejection amount of the molding material is suppressed by the connection between the rotation shaft 34 of the drive motor 33 and the rotor 40 in a state where the elastic member 37A is used to allow the posture change of the rotor 40 with respect to the connection unit 35. It is considered that this is because the rotation of the rotor 40 is stabilized, the plasticization of the molding material proceeds smoothly in the groove 42, and the ejection pressure at the ejection unit 60 is stabilized.

As described above, according to the plasticizing device 10A of the first embodiment, the variation of the posture of the rotor 40 with respect to the connection unit 35 is allowed by the elastic deformation of the elastic member 37A and the posture of the rotor 40 during the rotation is guided and corrected by the facing surface 52 inclined toward the center. Therefore, it is possible to stabilize the posture of the rotor 40 during the rotation and facilitate the plasticization of the material MR. Further, according to the three-dimensional modeling apparatus 100 including the plasticizing device 10A of the first embodiment, it is possible to stabilize the ejection amount of the molding material from the ejection unit 60 and the accuracy in molding an object is enhanced. In addition, according to the plasticizing device 10A and the modeling apparatus 100 of the first embodiment, it is possible to achieve various operational effects described in the present embodiment.

2. Second Embodiment

Figure 6B:
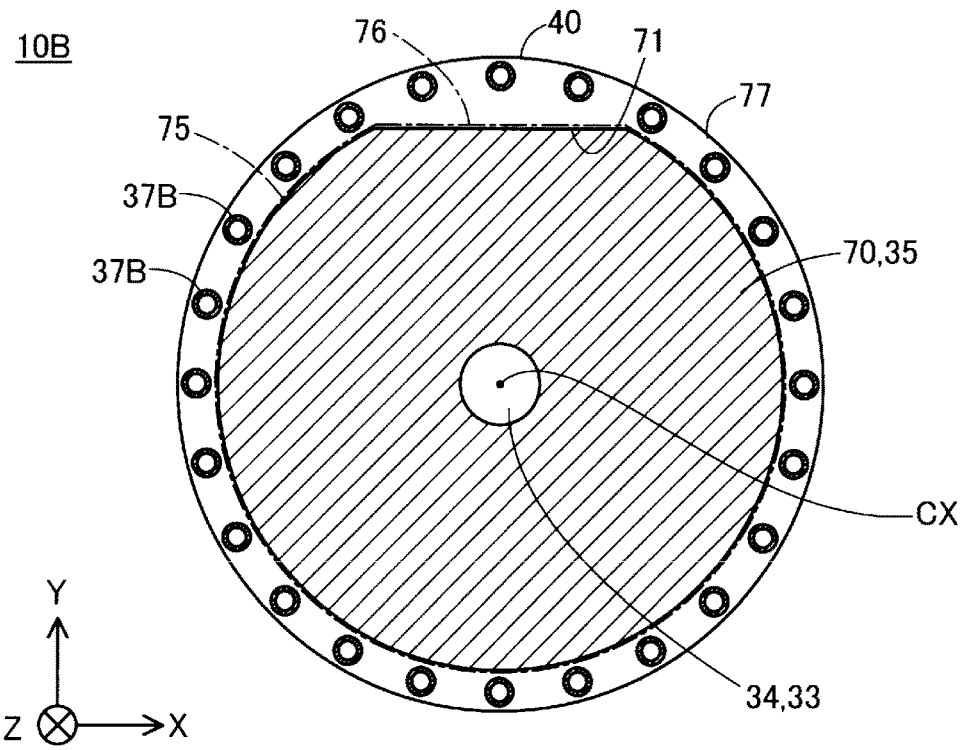
FIG. 6B is a schematic sectional view of the connection unit showing an arrangement configuration of an elastic member in the second embodiment.

FIG. 6A is a schematic sectional view showing a configuration of the connection unit 35 included in a plasticizing device 10B according to a second embodiment. FIG. 6B is a schematic sectional view of the connection unit 35 in the 6B-6B cutting shown in FIG. 6A and shows an arrangement configuration of the elastic member 37B according to the second embodiment. The plasticizing device 10B according to the second embodiment is almost the same as the plasticizing device 10A according to the first embodiment in configuration except that the connection unit 35 includes a plurality of elastic members 37B instead of the annular elastic member 37A. Like the plasticizing device 10A according to the first embodiment, the plasticizing device 10B according to the second embodiment is placed on the modeling apparatus 100 shown in FIG. 1 described in the first embodiment.

The plurality of elastic members 37B included in the connection unit 35 according to the second embodiment are configured with metal coil springs. In another embodiment, the plurality of elastic members 37B may be configured with columnar resin members disposed in the Z direction. As shown in FIG. 6A, respective elastic members 37B are disposed in a pinched state between the outer circumference flat portion 72 of the connection unit 35 and the outer circumference flat portion 77 of the rotor 40 with the direction parallel to the Z direction serving as the stretching/compression direction. As shown in FIG. 6B, respective elastic members 37B are arranged so as to surround the center axis CX of the rotor 40. According to the plasticizing device 10B of the second embodiment, it is possible to adjust the posture change of the rotor 40 with respect to the rotation shaft 34 of the drive motor 33 by the adjustment of the elasticity coefficient of each elastic member 37B and the arrangement intervals of each elastic member 37B. In addition, according to the plasticizing device 10B of the second embodiment and the modeling apparatus 100 having the plasticizing device 10B, it is possible to achieve various operational effects described in the first embodiment described above.

3. Third Embodiment

Figure 7:
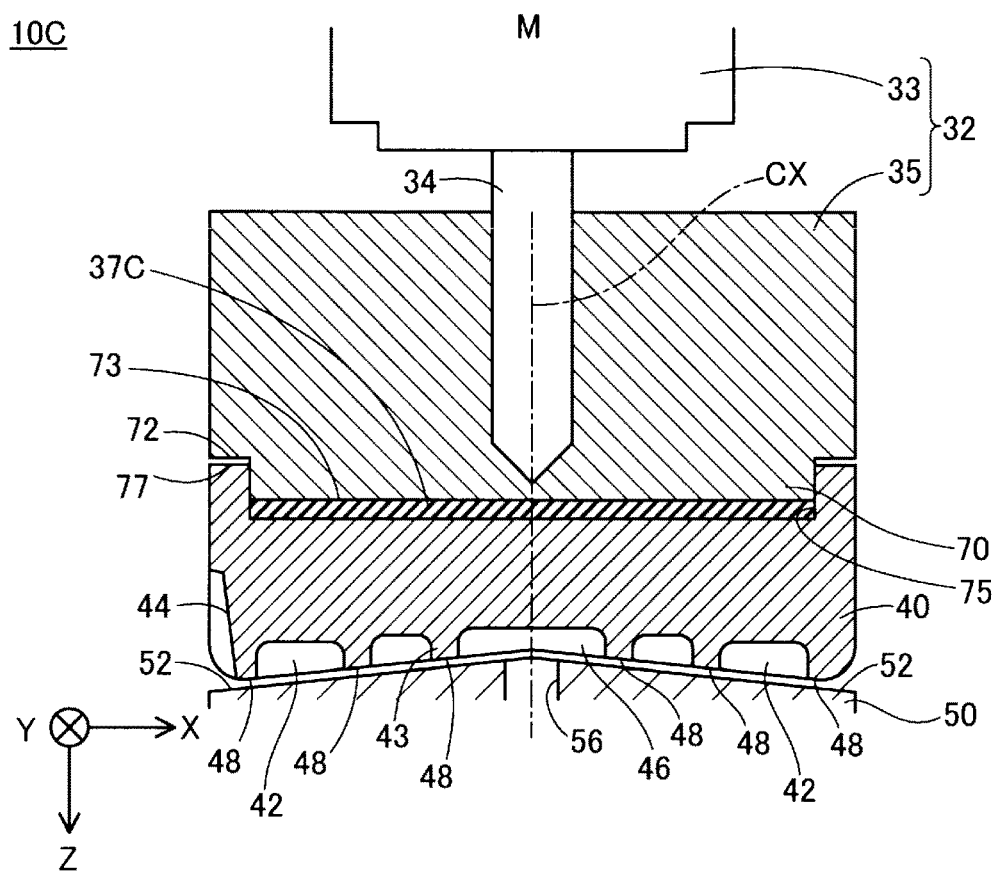
FIG. 7 is a schematic sectional view showing the configuration of the connection unit according to a third embodiment.

FIG. 7 is a schematic sectional view showing the configuration of the connection unit 35 of a plasticizing device 10C according to a third embodiment. The plasticizing device 10C according to the third embodiment is almost the same as the plasticizing device 10A according to the first embodiment in the configuration except that the connection unit 35 includes an elastic member 37C instead of the elastic member 37A. Like the plasticizing device 10A according to the first embodiment, the plasticizing device 10C according to the third embodiment is placed on the modeling apparatus 100 shown in FIG. 1 described in the first embodiment.

In the connection unit 35 included in the plasticizing device 10C according to the third embodiment, the elastic member 37C is configured with a sheet-like elastic member. The elastic member 37C is provided on an end surface 73 of the fitting protrusion portion 70 facing the bottom surface of the fitting recess portion 75 of the rotor 40 and is disposed inside the fitting recess portion 75 of the rotor 40. The elastic member 37C is disposed inside the fitting recess portion 75 so as to cover the bottom surface of the fitting recess portion 75. The outer circumference end of the elastic member 37C is positioned closer to the outer circumference end of the rotor 40 than to the center axis CX thereof. That is, at least a part of the elastic member 37C is positioned closer to the outer circumference end of the rotor 40 than to the center axis CX thereof. According to the plasticizing device 10C of the third embodiment, since the elastic member 37C is disposed inside the fitting recess portion 75, the detachment of the elastic member 37C from the connection unit 35 is suppressed. Further, since the elastic member 37C is configured in a sheet shape, the collapse of the disposition posture of the elastic member 37C is suppressed and it is possible to further stabilize the posture of the rotor 40 with respect to the connection unit 35. In addition, according to the plasticizing device 10C and the modeling apparatus 100 including the plasticizing device 10C of the third embodiment, it is possible to achieve various operational effects described in the first embodiment described above.

4. Fourth Embodiment

Figure 8A:
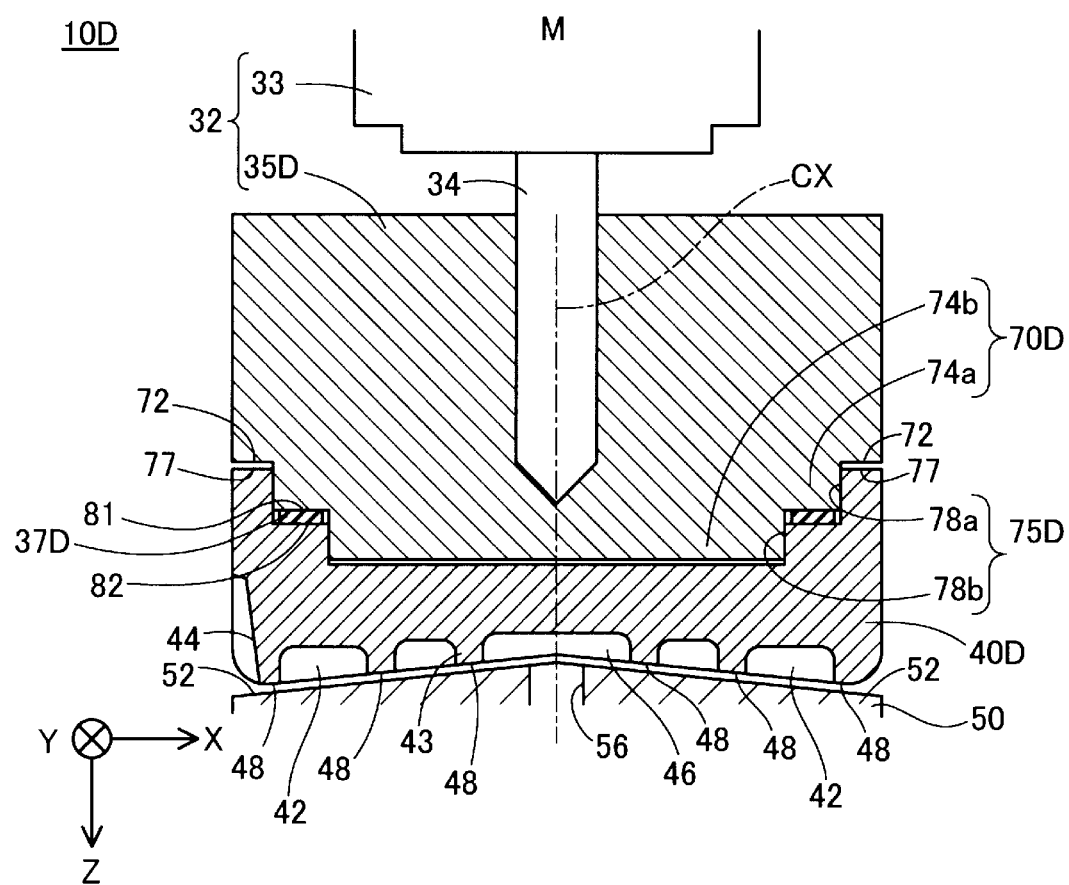
FIG. 8A is a schematic sectional view showing the configuration of the connection unit and the rotor according to a fourth embodiment.

FIG. 8A is a schematic sectional view showing a configuration of a connection unit 35D and a rotor 40D included in a plasticizing device 10D according to a fourth embodiment. FIG. 8B is a schematic plan view of the connection unit 35D according to the fourth embodiment as viewed from the direction opposite to the Z direction. In FIG. 8B, the center axis CX of the rotor 40D when a fitting recess portion 75D is fitted to the fitting protrusion portion 70D, and the openings of a first portion 78a and a second portion 78b of the fitting recess portion 75D are denoted by a one-dot chain line. Further, in FIG. 8B, hatching is applied to the elastic member 37D for the sake of convenience.

The plasticizing device 10D according to the fourth embodiment is almost the same as the plasticizing device 10A according to the first embodiment in the configuration except that the connection unit 35D and the rotor 40D are included instead of the connection unit 35 and the rotor 40. Like the plasticizing device 10A according to the first embodiment, the plasticizing device 10D according to the fourth embodiment is placed on the modeling apparatus 100 shown in FIG. 1 described in the first embodiment.

The configuration of the connection unit 35D according to the fourth embodiment is almost the same as the connection unit 35 according to the first embodiment except that the fitting protrusion portion 70D having a different shape is included and that the elastic member 37D having different disposition position is included. Further, the configuration of the rotor 40D according to the fourth embodiment is almost the same as the rotor 40 according to the first embodiment except that the fitting recess portion 75D conforming to the fitting protrusion portion 70D is included.

As shown in FIG. 8A, in the connection unit 35D according to the fourth embodiment, the fitting protrusion portion 70D has a shape in which cylindrical portions having different diameters are stacked in the Z direction such that the center axes coincide with each other. The fitting protrusion portion 70D has a first portion 74a with a large diameter on the drive motor 33 side and has a second portion 74b with a small diameter on the rotor 40D side. The first portion 74a protrudes from the outer circumference flat portion 72 like a step. The second portion 74b protrudes from the first portion 74a like a step in the Z direction. As shown in FIG. 8B, the engagement surface 71 is provided in the second portion 74b.

As shown in FIG. 8A, in the rotor 40D according to the fourth embodiment, the fitting recess portion 75D has a first portion 78a with a large inner diameter to which the first portion 74a of the fitting protrusion portion 70D fit on the connection unit 35D side. Further, the fitting recession portion 75D has a second portion 78b with a small internal diameter to which the second portion 74b of the fitting protrusion portion 70D fit on the facing unit 50 side. As shown in FIG. 8B, an inner wall surface of the second portion 78b includes the engagement target surface 76 facing the engagement surface 71 of the fitting protrusion portion 70D.

The elastic member 37D according to the fourth embodiment is configured with sheet-like resin member having an approximately annular shape. What is presented as an example in the first embodiment may be used as the resin member. As shown in FIG. 8A, the elastic member 37D is pinched between a connection unit side flat surface 81 surrounding the base of the second portion 74b of the fitting protrusion portion 70D and a rotor side flat surface 82 surrounding the opening unit of the second portion 78b of the fitting recess portion 75D. As shown in FIG. 8B, the elastic member 37D is disposed so as to surround the center axis CX of the rotor 40D. The elastic member 37D is disposed along the outer circumference of the rotor 40D inside the fitting recess portion 75. The outer circumference end of the elastic member 37D is disposed at a position closer to the outer circumference end of the rotor 40D than to the center axis CX thereof. At least a part of the elastic member 37D is disposed closer to the outer circumference end of the rotor 40D than to the center axis CX thereof.

In another embodiment, the elastic member 37D may be configured with a metal member formed to be elastically deformed such as a coil spring, annual plate spring, a wave washer, or an annular metal gasket. Further, as in the second embodiment, the configuration may be such that a plurality of elastic members are arranged so as to surround the center axis CX of the rotor 40D.

According to the plasticizing device 10D of the fourth embodiment, since the elastic member 37D is disposed inside the fitting recess portion 75D of the rotor 40D, the detachment of the elastic member 37D from prescribed disposition position is suppressed. Further, according to the plasticizing device 10D of the fourth embodiment, since the fitting protrusion portion 70D and the fitting recess portion 75D fit to each other at the first portions 74a and 78a and the second portions 74b and 78b respectively, it is more difficult for the rotor 40D to be detached from the connection unit 35D. In addition, according to the plasticizing device 10D and the modeling apparatus 100 including the plasticizing device 10D of the fourth embodiment, it is possible to achieve various operational effects described in the first embodiment described above.

5. Fifth Embodiment

Figure 9:
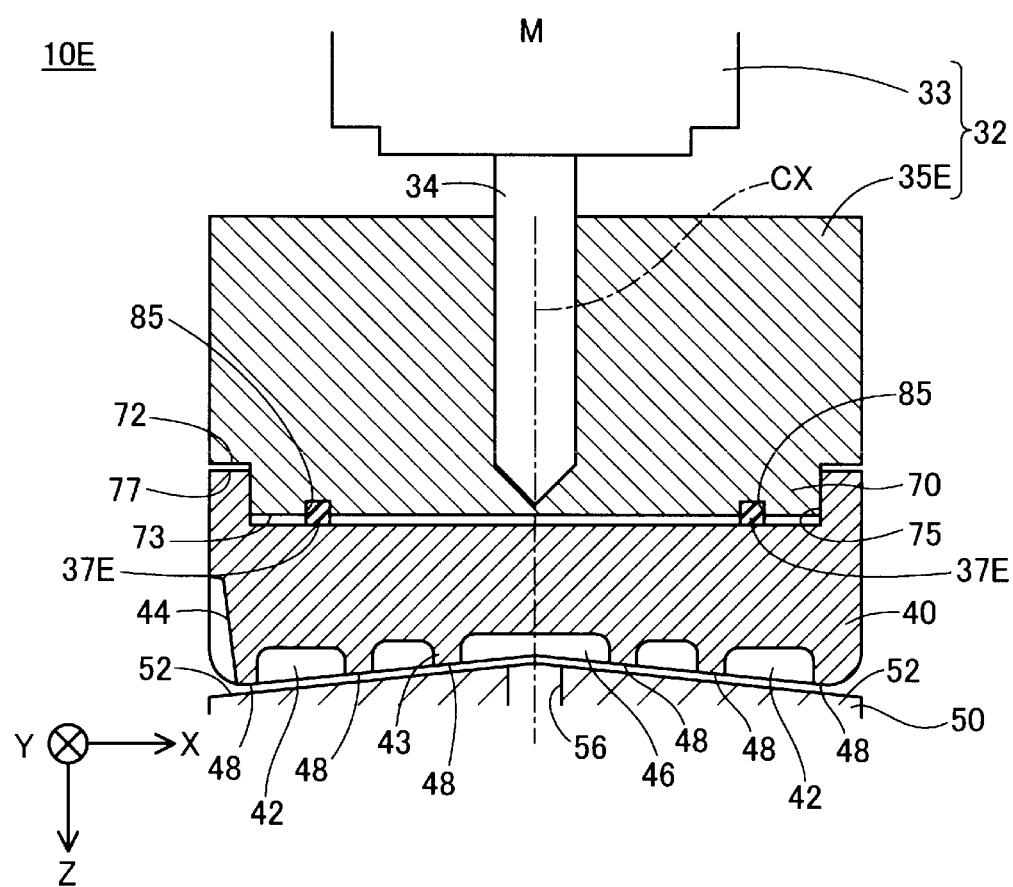
FIG. 9 is a schematic sectional view showing the configuration of the connection unit according to a fifth configuration.

FIG. 9 is a schematic sectional view showing the configuration of a connection unit 35E included in a plasticizing device 10E according to a fifth embodiment. The plasticizing device 10E according to the fifth embodiment is almost the same as the plasticizing device 10A according to the first embodiment in the configuration except that a connection unit side recess portion 85 is provided in the connection unit 35E and that the connection unit 35E includes an elastic member 37E of which a part is accommodated inside the connection unit side recess portion 85. Like the plasticizing device 10A according to the first embodiment, the plasticizing device 10E according to the fifth embodiment is placed on the modeling apparatus 100 shown in FIG. 1 described in the first embodiment.

In the connection unit 35E according to the fifth embodiment, the connection unit side recess portion 85 is provided on the end surface 73 of the fitting protrusion portion 70 facing the bottom surface of the fitting recess portion 75 of the rotor 40. The connection unit side recess portion 85 is configured with an annular groove formed to surround the center axis CX of the rotor 40. The connection unit side recess portion 85 is provided at a position closer to the outer circumference end of the rotor 40 than to the center axis CX thereof. The elastic member 37E according to the fifth embodiment is almost the same as the elastic member 37A according to the first embodiment except that the elastic member 37E is provided inside the connection unit side recess portion 85 and projects from the connection unit side recess portion 85 to contact with the bottom surface of the fitting recess portion 75. According to the plasticizing device 10E of the fifth embodiment, since the positional deviation of the elastic member 37E is suppressed, the eccentricity of the rotor 40 during rotation caused by the positional deviation of the elastic member 37E is suppressed. In addition, according to the plasticizing device 10E of the fifth embodiment and the modeling apparatus 100 including the plasticizing device 10E, it is possible to achieve various operational effects described in the first embodiment described above.

6. Sixth Embodiment

Figure 10:
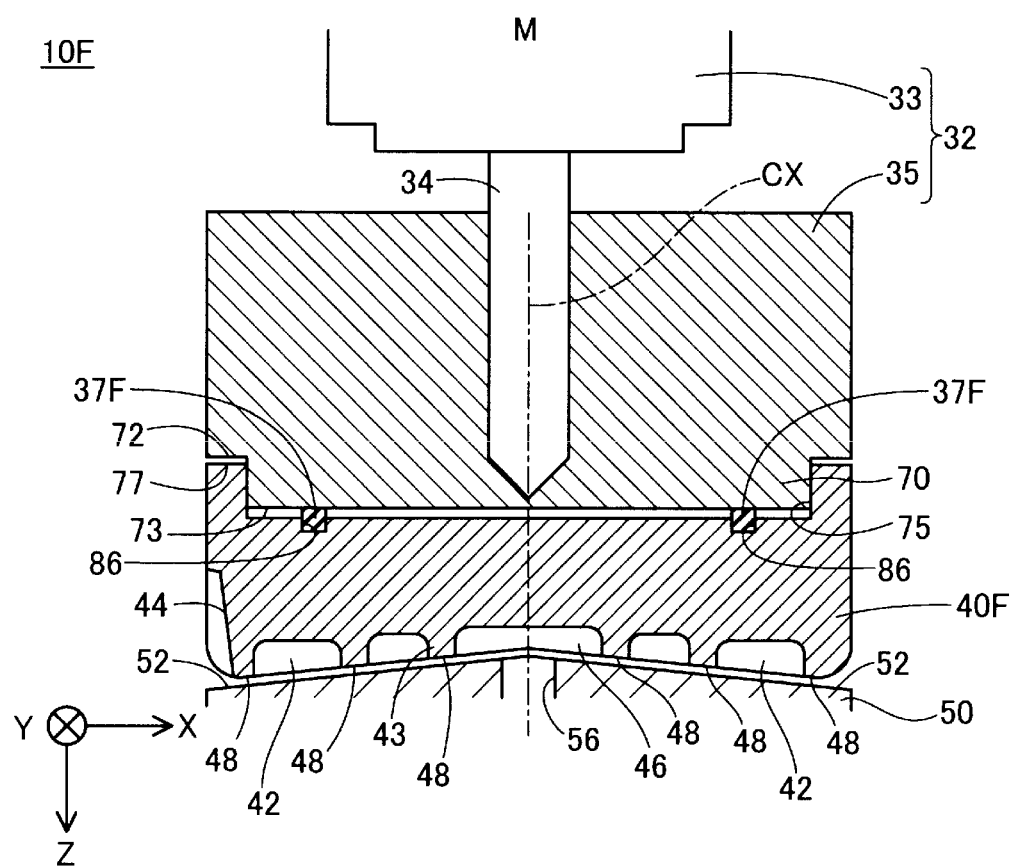
FIG. 10 is a schematic sectional view showing the configuration of the rotor according to a sixth embodiment.

FIG. 10 is a schematic sectional view showing the configuration of a rotor 40F including a plasticizing device 10F according to a sixth embodiment. The plasticizing device 10F according to the sixth embodiment is almost the same as the plasticizing device 10A according to the first embodiment in the configuration except that a rotor side recess portion 86 is provided in the rotor 40F and that the connection unit includes an elastic member 37F of which a part is accommodated inside the rotor side recess portion 86. Like the plasticizing device 10A according to the first embodiment, the plasticizing device 10F according to the sixth embodiment is placed on the modeling apparatus 100 shown in FIG. 1 described in the first embodiment.

In the rotor 40F according to the sixth embodiment, the rotor side recess portion 86 is provided on the bottom surface of the fitting recess portion 75. The rotor side recess portion 86 is configured with an annular groove portion formed so as to surround the center axis CX of the rotor 40. The rotor side recess portion 86 is positioned closer to the outer circumference end of the rotor 40 than to the center axis CX thereof. The elastic member 37F according to the sixth embodiment is almost the same as the elastic member 37A according to the first embodiment except that the elastic member 37F is disposed inside the rotor side recess portion 86 and protrudes from the rotor side recess portion 86 to contact with the end surface 73 of the fitting protrusion portion 70 of the connection unit 35. According to the plasticizing device 10F of the sixth embodiment, since the positional deviation of the elastic member 37F is suppressed, the eccentricity of the rotor 40 during rotation caused by the positional deviation of the elastic member 37F is suppressed. In addition, according to the plasticizing device 10F and modeling apparatus 100 including the plasticizing device 10F of the sixth embodiment, it is possible to achieve various operational effects described in the first embodiment described above.

7. Other Embodiments

The various configurations described in the respective embodiments described above may be modified in the following manner. Like the respective embodiments described above, any of the embodiments to be described below is positioned as an example of aspects to implement the technology of the present disclosure.

(1) Other Embodiment 1

In the respective embodiment described above, the groove-formed surface 48 may be inclined from the center axis CX the rotors 40, 40D, and 40F toward the outer circumference end, that is, toward the outside in the radial direction. In this case, the facing surface 52 is inclined from the outer circumference end toward the center axis CX of the rotors 40, 40D, and 40F, that is, toward the inside in the radial direction.

(2) Other Embodiment 2

In the respective embodiments described above, the fitting protrusion portion 70 and 70D are provided in the rotors 40, 40D, and 40F and the fitting recess portions 75 and 75D are provided in the connection units 35, 35D, and 35E. Contrary to this, the fitting protrusion portion 70 may be provided in the rotors 40, 40D, and 40F and the fitting protrusion portion 70 and 70D may be provided in the connection units 35, 35D, and 35E. That is, the fitting protrusion portion 70 and 70D may be provided in one of the rotors 40, 40D, and 40F and the connection units 35, 35D, and 35E and the fitting recess portion 75 corresponding to the fitting protrusion portion 70 and 70D may be provided in the other. The fitting protrusion portion 70 and 70D may not have an approximately cylindrical shape and may also have a polygonal shape.

(3) Other Embodiment 3

In the respective embodiments described above, the distance between the groove-formed surface 48 of the rotors 40, 40D, and 40F and the facing surface 52 of the facing unit 50 decreases from the outer circumference end of the rotor 40 toward the center axis CX. Contrary to this, the distance between the groove-formed surface 48 and the facing surface 52 may be almost constant in the radial direction of the rotor 40. Alternatively, the distance between the groove-formed surface 48 and the facing surface 52 may increase from the outer circumference end of the rotor 40 toward the center axis CX.

(4) Other Embodiment 4

In the first and second embodiments described above, the elastic members 37A and 37B may be accommodated in the connection unit side recess portion 85 according to the fifth embodiment or the rotor side recess portion 86 described in the sixth embodiment. In the third embodiment described above, instead of the elastic member 37C, a plurality of elastic members 37B described in the second embodiment may be disposed over the whole bottom surface of the fitting recess portion 75.

(5) Other Embodiment 5

The plasticizing devices 10A, 10B, 10C, and 10D according to the respective embodiments described above may not be placed on the modeling apparatus 100 and may be placed on another device using the plasticized material. The plasticizing devices 10A, 10B, 10C, and 10D may be placed on an injection modeling apparatus, for example. In this case, the communication hole 56 of the facing unit 50 is coupled to a cavity of a mold.

8. Example of Molding Material

A specific example of the molding material used in the modeling apparatus 100 according to the respective embodiments described above will be described. In the modeling apparatus 100, it is possible to mold an object with various materials such as a material having thermoplasticity, a metal material, a ceramic material, or the like as the main material. Here, the "main material" means a material serving as the center of the molding material generated in the plasticizing device 10A and means a material occupying 50 weight percent or more in the molding material. The molding material described above includes a material into which the main material alone is melted or a pasty material into which a part of components contained together with the main material is melted.

When a material having the thermoplasticity is used as the main material, the main material is plasticized in the generation unit 30 to generate the molding material. The thermoplastic resin material described below may be used as a material having the thermoplasticity, for example.

Examples of Thermoplastic Resin Material

General purpose engineering plastics such as a polypropylene (PP) resin, a polyethylene (PE) resin, a polyacetal (POM) resin, a polyvinyl chloride (PVC) resin, a polyamide (PA) resin, an acrylonitrilebutadiene styrene (ABS) resin, a polylactic acid (PLA) resin, a polyphenylene sulfide (PPS) resin, polyether ether ketone (PEEK), polycarbonate (PC), modified polyphenylene ether, polybutylene terephthalate, polyethylene terephthalate, and the like and engineering plastics such as polysulfone, polyethersulfone, polyphenylene sulfide, polyarylate, polyimide, polyamideimide, polyetherimide, polyether ether ketone, and the like Pigments, metals, ceramics, and additives such as wax, flame retardant, antioxidant, heat stabilizer, and the like may be mixed in the material having the thermoplasticity. The generation unit 30 melts, and converts into a plasticized state, the material having the thermoplasticity by the rotation of the rotor 40 and the heating of the heater 58. The molding material generated by melting of the material having the thermoplasticity is ejected from the nozzle 61 and then cures by temperature falling.

It is desirable that the material having the thermoplasticity is heated to the glass transition point or higher to be ejected from the nozzle 61 in a completely melted state. For example, the glass transition point of the ABS resin is approximately 120° C., and it is desirable the temperature reaches 200° C. at the time of ejection from the nozzle 61. The heater may be provided around the nozzle 61 in order to eject the molding materials in a state of such high temperature.

In the modeling apparatus 100, instead of the material having the thermoplasticity described above, the following metal material may be used as the main material, for example. In this case, it is desirable that a component to be melted and plasticized when the molding materials is generated is mixed in the powder material into which the following metal material is powdered and is supplied to the generation unit 30 as a material MR.

Examples of Metal Material

A single metal of magnesium (Mg), iron (Fe), cobalt (Co), chromium (Cr), aluminum (Al), titanium (Ti), copper (Cu) and nickel (Ni), or an alloy containing one or more of these metals Examples of Alloy Described Above Maraging steel, stainless steel, cobalt chromium molybdenum steel, titanium alloy, nickel alloy, aluminum alloy, cobalt alloy, and cobalt chromium alloy In the modeling apparatus 100, instead of the metal material described above, a ceramic material may be used as the main material. Oxide ceramics such as silicon dioxide, titanium dioxide, aluminum oxide, zirconium oxide, or the like and non-oxide ceramics such as aluminum nitride or the like may be used as the ceramic material, for example. When the metal material or the ceramic material described above is used as the main material, the molding material disposed on the table 110 may be cured by sintering.

The powder material of the metal material or the ceramic material input into the material supply source 21 as the material MR may be a mixed material into which a plurality of types of single metal powder, alloy powder, and ceramic material powder are mixed. Further, the powder materials of the metal material or the ceramic material may be coated with a thermoplastic resin presented as an example above or another thermoplastic resin, for example. In this case, the thermoplastic resin may be melted to develop fluidity in the generation unit 30.

It is possible to add the following solvents to the power material of the metal material or the ceramic material to be input into the material supply source 21 as the material MR. It is possible to use one type or a combination of two types or more of the solvents selected from the following.

Examples of Solvent

Water, (poly) alkylene glycol monoalkyl ethers such as ethylene glycol monomethyl ether, ethylene glycol monoethyl ether, propylene glycol monomethyl ether, propylene glycol monoethyl ether, and the like, acetic acid esters such as ethyl acetate, n-propyl acetate, iso-propyl acetate, n-butyl acetate, iso-butyl acetate, and the like, aromatic hydrocarbons such as benzene, toluene and xylene, ketones such as methyl ethyl ketone, acetone, methyl isobutyl ketone, ethyl-n-butyl ketone, diisopropyl ketone, acetylacetone, and the like, alcohols such as ethanol, propanol and butanol, and the like, tetraalkyl ammonium acetates, sulfoxide solvents such as dimethyl sulfoxide, diethyl sulfoxide, and the like, pyridine solvents such as pyridine, γ-picoline, 2,6-lutidine, and the like, ionic liquids such as tetraalkyl ammonium acetate (for example, tetrabutyl ammonium acetate and the like), butyl carbitol acetate, and the like In addition, it is possible to add the following binder in the powder material of the metal material or the ceramic material input into the material supply source 21 as the material MR.

Examples of Binder

Acrylic resin, epoxy resin, silicone resin, cellulose resin or other synthetic resin or polylactic acid (PLA), polyamide (PA), polyphenylene sulfide (PPS), polyether ether ketone (PEEK) or other thermoplastic resin 9. Examples of Aspect The technology according to the present disclosure is not limited to the respective embodiments or examples described above and may be realized in various aspects within a range not deviating from the scope of the disclosure. For example, the technology according to the present disclosure may be realized in the following aspects. The technical features of the respective embodiment described above corresponding to the technical features of respective aspects to be described below may be replaced or combined as deemed appropriate in order to solve some or all of the problems that the technology according to the present disclosure has to achieve or to achieve some or all of the effects that the technology according to the present disclosure has to achieve. Further, the technical features may be removed as deemed appropriate as long as the technical features are not described as indispensable in the present specification.

(1) According to a first aspect, there is provided a plasticizing device. The plasticizing device of the aspect includes a rotor having a rotation shaft and a groove-formed surface that includes a groove formed in the rotation direction and that is inclined from the rotation shaft in a radial direction with respect to the radial direction orthogonal to a center axis, a facing unit having a facing surface inclined so as to face the groove-formed surface in the radial direction, a heater heating a material to be supplied between the facing surface and the groove, and a communication hole through which the material plasticized by heat of the heater flows, a drive motor generating a rotational driving force, a connection unit fitting to the rotor in a direction along the rotation shaft of the drive motor, connecting the rotation shaft of the motor and the rotor to each other, and transmitting the rotational driving force of the motor to the rotor, and an elastic member disposed between the rotor and the connection unit.

According to the plasticizing device of the aspect, the rotational driving force of the drive motor is transmitted to the rotor by the connection unit in a state where the posture change of the rotor with respect to the rotation shaft of the drive motor is allowed by the elastic deformation of the elastic member. Therefore, it is possible to correct the posture while the rotor rotates by the guide of the facing surface which faces the groove-formed surface and which is inclined toward the center so that the eccentricity of the rotation shaft of the rotor is improved. Therefore, it is possible to stabilize the rotation of the rotor and realize stable plasticization of the material in the groove of the rotor.

(2) In the plasticizing device according to the aspect described above, at least a part of the elastic member may be disposed at a position closer to the outer circumference end of the rotor than to the center thereof.

According to the plasticizing device of the aspect, since the destabilization of the posture of the rotor is suppressed by the elastic member, it is possible to rotate the rotor more stably.

(3) In the plasticizing device according to the aspect described above, one of the connection unit and the rotor may have a fitting protrusion portion projecting in the direction along the rotation shaft of the drive motor, the other of the connection unit and the rotor may have a fitting recess portion into which the fitting protrusion portion is inserted in the direction along the rotation shaft of the drive motor, and the elastic may be disposed inside the fitting recess portion.

According to the plasticizing device of the aspect described above, it is possible to easily connect the rotor and the connection unit by the fitting of the fitting protrusion portion and the fitting recess portion. Further, since the elastic member is disposed inside the fitting recess portion, the detachment of the elastic member from the connection unit is suppressed.

(4) In the plasticizing device according to the aspect described above, the elastic member may be disposed along the outer circumference of the rotor.

According to the plasticizing device of the aspect, it is possible to further suppress the eccentricity of the rotation axis of the rotor.

(5) In the plasticizing device according to the aspect described above, the elastic member may be an annular member surrounding the center axis of the rotor.

According to the plasticizing device of the aspect, it is possible to simplify the configuration of the connection unit. Further, it is possible to facilitate the installation of the elastic member in the connection unit.

(6) In the plasticizing device according to the aspect described above, on the surface facing the rotor, the connection unit may have a connection unit side recess portion which accommodates the elastic member and to which the elastic member is fixed.

According to the plasticizing device of the aspect, it is possible to suppress the positional deviation of the elastic member.

(7) In the plasticizing device according to the aspect described above, the rotor may have the rotor side recess portion which accommodates the elastic member and to which the elastic member is fixed.

According to the plasticizing device of the aspect, it is possible to suppress the positional deviation of the elastic member.

(8) In the plasticizing device according to the aspect described above, the distance between the groove-formed surface and the facing surface may decrease from the outer circumference end of the rotor toward the center axis.

According to the plasticizing device of the aspect, the wear of the portions on the outer circumference sides of the rotor and the facing unit is suppressed by the material that just starts to be plasticized.

(9) According to a second aspect, there is provided a three-dimensional modeling apparatus. The three-dimensional modeling apparatus according to the aspect includes the plasticizing device according to any of the aspects described above, the ejection unit ejecting the molding material plasticized by the plasticizing device, and a molding stage on which the molding material ejected from the ejection unit is accumulated.

According to the three-dimensional modeling apparatus of the aspect, since the plasticization is stably performed in the plasticizing device, it is possible to stabilize the ejection of the molding material from the ejection unit and raise the molding accuracy of a three-dimensional object.

The technology according to the present disclosure may be realized in various aspects other than the plasticizing device and the three-dimensional modeling apparatus. For example, it is possible to realize in an aspect such as a plasticization method of plasticizing a material, an injection modeling apparatus including a plasticizing device, and the like.

What is claimed is:

1. A plasticizing device comprising:
    a rotor having:
    a rotation shaft and
    a groove-formed surface that includes a groove formed in a rotation direction and that is inclined from the rotation shaft in a radial direction;
    a facing unit having a facing surface circumferentially inclined so as to face the groove-formed surface in the radial direction, a heater heating a material to be supplied between the facing surface and the groove, and a communication hole through which the material plasticized by heat of the heater flows;
    a drive motor generating rotational driving force;
    a connection unit fitting to the rotor in a direction along a rotation shaft of the drive motor, connecting the rotation shaft of the drive motor and the rotor to each other, and transmitting the rotational driving force of the drive motor to the rotor; and
    an elastic member disposed between the rotor and the connection unit,
    wherein one of the connection unit and the rotor has a fitting protrusion portion projecting in a direction along the rotation shaft of the drive motor,
    the other of the connection unit and the rotor has a fitting recess portion info which the fitting protrusion portion is inserted in the direction along the rotation shaft of the drive motor,
    the elastic member is disposed inside the fitting recess portion, and
    the elastic member is disposed along an outer circumference of the rotor.

2. The plasticizing device according to claim 1, wherein at least a part of the elastic member is disposed at a position closer to outer circumference end of the rotor than to a center thereof.

3. The plasticizing device according to claim 1, wherein the elastic member is an annular member surrounding a center axis of the rotor.

4. The plasticizing device according to claim 1, wherein the connection unit has, on a surface facing the rotor, a connection unit side recess portion which accommodates the elastic member and to which the elastic member is fixed.

5. The plasticizing device according to claim 1, wherein the rotor has a rotor side recess portion which accommodates the elastic member and to which the elastic member is fixed.

6. The plasticizing device according to claim 1, wherein a distance between the groove-formed surface and the facing surface decreases from an outer circumference end of the rotor toward a center axis.

7. A three-dimensional modeling apparatus comprising:
a plasticizing device according to claim 1;
an ejection unit ejecting a molding material plasticized by the plasticizing device; and
a molding stage on which the molding material ejected from the ejection unit is accumulated.

\* \* \* \* \*